United States Patent
Chung et al.

(10) Patent No.: US 10,318,694 B2
(45) Date of Patent: Jun. 11, 2019

(54) ADAPTIVE MULTI-TIER POWER DISTRIBUTION GRIDS FOR INTEGRATED CIRCUITS

(71) Applicant: QUALCOMM Incorporated, San Diego, CA (US)

(72) Inventors: Joon Hyung Chung, San Marcos, CA (US); Mikhail Popovich, San Marcos, CA (US); Gudoor Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/432,431

(22) Filed: Feb. 14, 2017

(65) Prior Publication Data

US 2018/0144086 A1 May 24, 2018

Related U.S. Application Data

(60) Provisional application No. 62/424,289, filed on Nov. 18, 2016.

(51) Int. Cl.
| | |
|---|---|
| *H01L 23/48* | (2006.01) |
| *H01L 29/40* | (2006.01) |
| *H01L 23/50* | (2006.01) |
| *G06F 17/50* | (2006.01) |
| *H01L 23/522* | (2006.01) |
| *H01L 23/528* | (2006.01) |

(52) U.S. Cl.
CPC ........ *G06F 17/5077* (2013.01); *G06F 17/505* (2013.01); *G06F 17/5068* (2013.01); *G06F 17/5072* (2013.01); *G06F 17/5081* (2013.01); *H01L 23/5226* (2013.01); *H01L 23/5286* (2013.01); *G06F 2217/66* (2013.01); *G06F 2217/78* (2013.01)

(58) Field of Classification Search
CPC ............ G06F 17/5077; G06F 17/5081; G06F 17/505; G06F 17/5072; H01L 23/5226; H01L 23/5286
See application file for complete search history.

(56) References Cited

U.S. PATENT DOCUMENTS

| | | | |
|---|---|---|---|
| 7,480,887 B1 | 1/2009 | Hsu | |
| 2004/0089953 A1* | 5/2004 | McCormick | H01L 21/76877 257/775 |
| 2005/0133894 A1* | 6/2005 | Bohr | H01L 23/5286 257/678 |
| 2006/0234496 A1* | 10/2006 | Zhao | H01L 21/76802 438/637 |
| 2011/0140272 A1* | 6/2011 | Zhao | H01L 23/24 257/738 |

(Continued)

OTHER PUBLICATIONS

International Search Report and Written Opinion—PCT/US2017/058550—ISA/EPO—Mar. 15, 2018.

(Continued)

*Primary Examiner* — Ismail A Muse
(74) *Attorney, Agent, or Firm* — Haynes and Boone, LLP (36340)

(57) ABSTRACT

The place and route stage for a hard macro including a plurality of tiles is modified so that some of the tiles are assigned a more robust power-grid tier and so that others ones of the tiles are assigned a less robust power-grid tier.

7 Claims, 7 Drawing Sheets

(56) References Cited

U.S. PATENT DOCUMENTS

| | | | | |
|---|---|---|---|---|
| 2011/0260318 A1* | 10/2011 | Eisenstadt | ........... | G06F 17/5054 |
| | | | | 257/737 |
| 2013/0091478 A1 | 4/2013 | Li et al. | | |
| 2014/0252650 A1* | 9/2014 | Utsumi | ............... | H01L 23/5226 |
| | | | | 257/774 |
| 2015/0379182 A1* | 12/2015 | Huynh | ................ | G06F 17/5072 |
| | | | | 716/124 |
| 2017/0093405 A1* | 3/2017 | Wang | ............... | H03K 19/17772 |
| 2018/0323148 A1* | 11/2018 | Nakayama | .......... | H01L 23/5286 |

OTHER PUBLICATIONS

Partial International Search Report—PCT/US2017/058550—ISA/EPO—Jan. 19, 2008.

Singh J., et al., "A fast Algorithm for power grid design," Proceedings of the International Symposium on Physical Design—Proceedings Of ISPD ' May 2005 International Symposium on Physical Design 2005 Association for Computing Machinery, US, 2005, pp. 70-77, XP002561674.

Singh J., et al., "Partition-based Algorithm for Power Grid Design Using Locality," IEEE Transactions on Computer-Aided Design of Integrated Circuits and Systems IEEE, USA, vol. 25, No. 4, Apr. 2006, pp. 664-677, XP002561675.

\* cited by examiner

ADAPTIVE MULTI-TIER POWER DISTRIBUTION GRIDS FOR INTEGRATED CIRCUITS

CROSS-REFERENCE TO RELATED APPLICATIONS

This application claims the benefit of U.S. Provisional Application No. 62/424,289, filed Nov. 18, 2016.

TECHNICAL FIELD

This application relates to power distribution for integrated circuits, and more particularly to an integrated circuit adaptive multi-tier power distribution grid.

BACKGROUND

Power distribution is a critical factor in integrated circuit design. For example, a microprocessor integrated circuit such as a system-on-a-chip (SoC) contains numerous transistors that may shift from being idle to actively switching. The sudden transition of so many transistors into an active state causes the power supply voltage to the transistors to fluctuate. If the power supply voltage drops below a minimum required value due to such a fluctuation, the system may reset or experience an error. The resistance of the power grid providing the power supply voltage is an important factor with regard to minimizing the voltage drop in response to the sudden activation of a circuit module. For example, the number of vias (via density) from the power rail to the various transistors in a circuit module may be increased compared to other modules depending upon the power demands. In addition, the width and density of the power rails may be increased. Similarly, the number of head switches coupling one power domain's rails to a main power rail may be varied depending upon a given circuit module's power needs. Finally, the number and density of decoupling capacitors supporting a given power domain's power rails may be varied also.

It is thus conventional to design an SoC to include a plurality of power-grid tiers. Each tier corresponds to a certain set of power-grid factors such as the via density, power rail width and density, head switch density, and decoupling capacitor density factors. These power-grid factors may be better appreciated with reference to a process flow for a traditional physical design (PD) of an integrated circuit as shown in FIG. 1. The process begins with a block floorplan flow step 100 that receives various inputs such as the desired netlist, the unified power format (UPF), timing constraints, multi-voltage (MV) island constraints, and pin preferences to perform a robust power-grid plan in which the logic functions for various hard macros (circuit modules) are assigned to a given power-grid tier based upon the inputs. The power-grid planning is deemed as "robust" in that a given hard macro is assigned to a corresponding power-grid tier the resulting voltage rails will thus have the same via density and other power-grid tier factors throughout the entire hard macro. With the power-grid tiers assigned, a place and route step 105 may be performed that includes conventional cell placement, clock tree synthesis, routing, and finishing (engineering change order (ECO), and design-for-manufacturing (DFM) sub-steps. The process continues with a parasitic resistance and capacitance (RC) extraction step 110 followed by a timing, noise, and power analysis step 115. Finally, the design is subjected to a current*resistance (IR) drop analysis 120 that determines whether the hard macro has regions in which the power supply voltage has dropped undesirably. If the design does not satisfy the IR drop analysis, the power-grid planning step 100, place and route step 105, RC extraction step 110 and timing, noise, and power analysis step 115 are repeated as necessary to accommodate the necessary design modification through an engineering change order (ECO).

The conventional SoC design process must also satisfy density reduction and associated cost issues. It is thus quite challenging to assign the appropriate power-grid tier to a given circuit module. If the power-grid tier is too robust for the corresponding circuit module's power demands, density suffers. Conversely, if the power grid tier is insufficient, the circuit module may reset and/or malfunction due to an insufficient power supply voltage. In addition, factors such as non-linear resistance scaling, lack of on-chip resources, increased performance requirements, density, and routability complicate the design of the power-grid. For example, FIG. 2 illustrates the power supply voltage drops (IR drops) for a conventional hard macro designed according to the process flow discussed with regard to FIG. 1. In this instance, a third tier power-grid (PG3) has been selected for the entire hard macro. The design has resulted in a variety of clusters 200 of clock (CLK) drivers having large drive strength in the vicinity of the critical path, which causes undesired localized power supply voltage drops. Yet a substantial portion of the hard macro is over-served by PG3 such as a region 205, which lowers routability and increases costs.

Accordingly, there is a need in the art for improved power-grid architectures for integrated circuits.

SUMMARY

An improved power-grid tier design process is provided in which a hard macro receives a plurality of power-grid tier assignments. As used herein, the term "hard macro" refers to a fully routed design that is ready to be implemented in a semiconductor masking step during manufacture of a semiconductor die including the circuit module implemented through the hard macro. The hard macro occupies an overall footprint on the semiconductor die. This footprint includes a plurality of circuit tiles, wherein each tile occupies a certain amount of die space within the footprint. Some of the tiles such as those instantiating a critical path for the hard macro are assigned more robust power-grid tiers whereas a remainder of tiles in the hard macro receives less robust power-grid tiers depending upon their expected power supply voltage drops. In particular, if a tile is determined to have too high of a power supply voltage drop when given a less robust power-grid tier, the tile is then assigned a more robust power-grid tier. In this fashion, the problems of localized reduced power supply voltages and also the density issues resulting from a conventional fixed power-grid assignment to a hard macro are relieved.

These and additional advantages may be better appreciated through the following detailed description.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
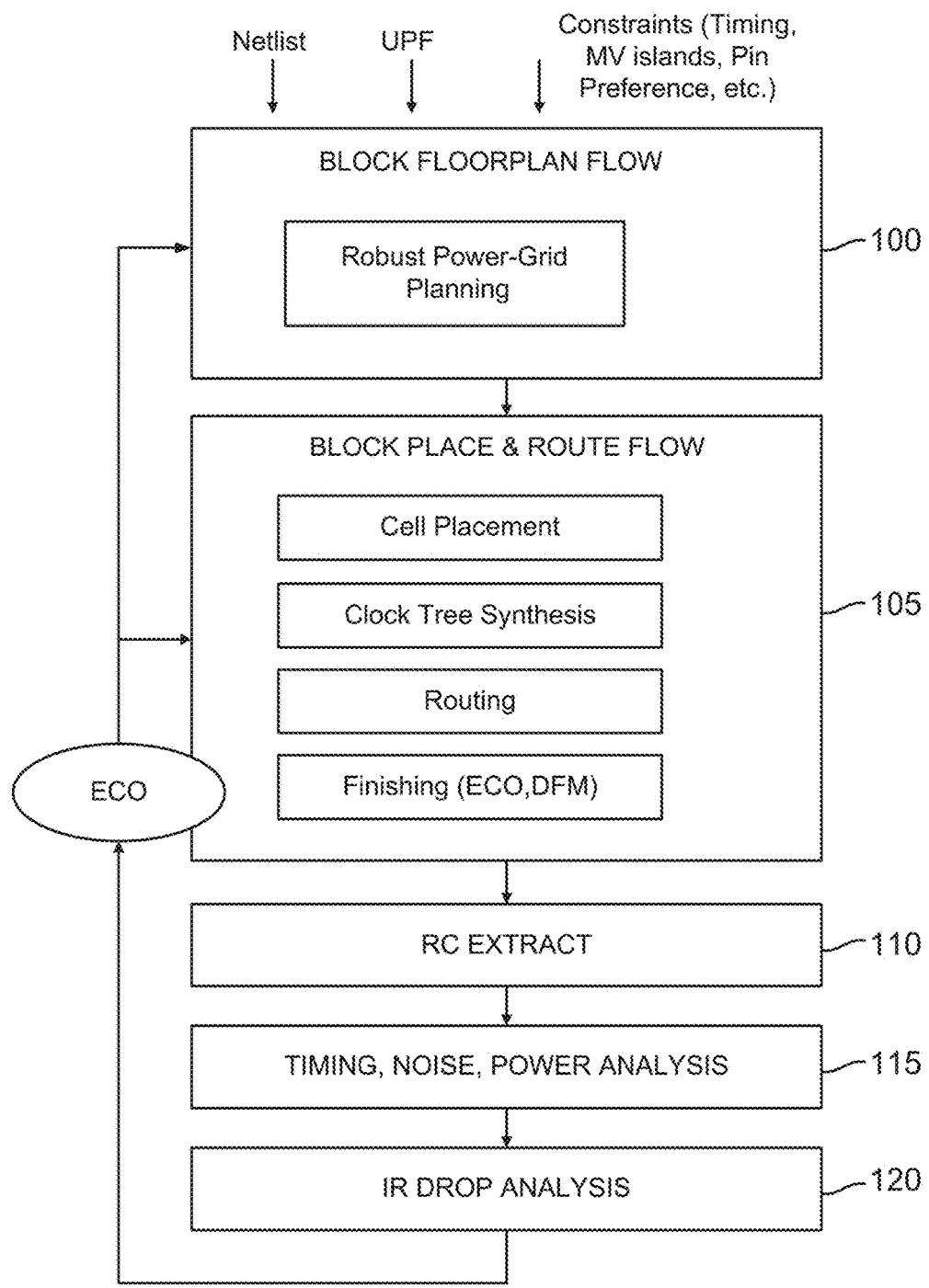
FIG. 1 is a flowchart for a conventional physical design process.

An adaptive multi-tier power grid for integrated circuits is provided in which the power-grid planning for a hard macro is relaxed during the design stage to accommodate localized areas of power supply voltage drop caused by the ohmic loss (current*resistance (IR)) within circuit elements such as clock drivers and to provide additional power grid resources for the die regions. The hard macro will occupy a certain amount of die space on its semiconductor die that is denoted herein as its footprint. Depending upon the functional aspects of the devices forming the hard macro, the footprint is divided into a plurality of tiles. The sizes of the tiles will vary depending upon the needs of the corresponding function they are implementing. As used herein, the regions of significant localized power supply voltage drop in the tiles are denoted as "hot spots." The relaxation of the power-grid planning enables an individual hard macro to include a plurality of power-grid tiers such that the various tiles within the footprint are assigned different power-grid tiers. Those tiles having relatively little localized power supply voltage drops are assigned less robust power-grid tiers. Conversely, tiles having more pronounced power supply voltage drops are assigned more robust power-grid tiers. In this fashion, the power-grid assignment is optimized in that the tiles incorporating the critical path in the hard macro may receive the more robust power-grid tiers whereas the non-critical tiles may receive the less robust power-grid tiers. The problems of an individual hard macro having both an insufficient power-grid tier in certain regions and an overly-robust power-grid tier in other regions are thus relieved.

As used herein, a power-grid tier refers to a certain assignment to each of the following factors: the number of vias (via density) from a power rail to the various transistors in a circuit module; the width and density of the power rails for a circuit module; the number of head switches coupling a power domain for a circuit module to a main power rail; and the number and density of decoupling capacitors supporting power delivery by the power rails for a circuit module. In particular, a power-grid tier refers to a specific assignment to at least one of these factors. One power-grid tier may then be classified as more robust compared to another power-grid tier if at least one of these factors is changed to produce less power supply voltage drop. In general, a designer may choose from a plurality of power-grid tiers, ranging from a lowest tier in which the factors have their lowest values to a highest tier in which the factors have their highest values.

To solve the problems of an individual hard macro having both an insufficient power-grid tier in certain regions and an overly-robust power-grid tier in other regions, the critical path tiles for the hard macro are identified during the place and route step during the physical design process. The critical path tiles may then be assigned a more robust power-grid tier. The default state for the remainder of the tiles forming the hard macro would be a more relaxed power-grid tier, which results in greater density. With the critical path identified, its clock drivers may be de-clustered during the place and route step such that no oversized, unnecessarily large clock drivers need be used during the place and route stage. This de-clustering of the clock drivers improves the IR drop (localized hotspot) issue.

Figure 3:
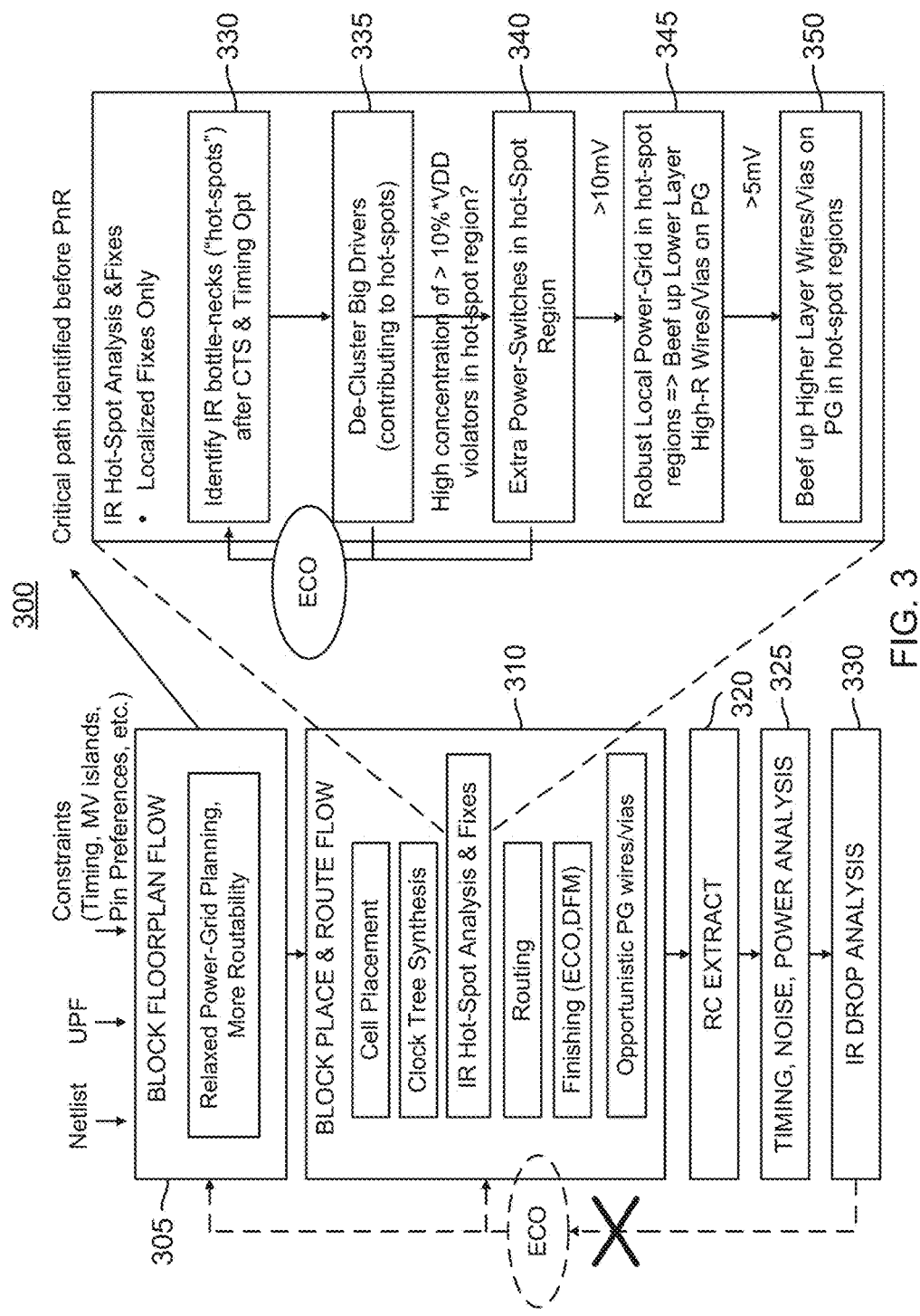
FIG. 3 is a flowchart for physical design process providing an adaptive power grid tier assignment for a hard macro in accordance with an aspect of the disclosure.

An example physical design flow 300 to achieve these advantageous results is shown in FIG. 3. The process begins with a power-grid planning stage 305 that depends upon the conventional netlist, unified power format (UPF), timing constraints, multi-voltage (MV) island constraints, and pin preference constraints as discussed with regard to stage 100 of FIG. 1. However, stage 305 is more relaxed as compared to stage 100 in that stage 305 involves the adaptive assignment of the power-grid tiers for a given hard macro through the identification of the critical path tiles. The critical path tiles are thus assigned a more robust power-grid tier whereas the tiles forming a remainder of the hard macro are assigned a less robust power-grid tier. As noted earlier, each power-grid tier involves a certain assignment of via size, enclosure, via pitch and density, power and ground rail width and pitch, the density and pitch of power switches, and the density of the decoupling capacitors.

A subsequent place and route stage 310 includes a conventional cell placement and a clock tree synthesis. But these conventional analyses are followed by a power supply voltage drop (IR) hot spot analysis and power-grid adjustment step 330 that includes an identification of IR bottlenecks (hot spots) after the clock tree synthesis and timing optimization. For example, the hot spots are identified through a power supply voltage drop threshold being crossed in a simulation of the design. The clock drivers for the tiles having the hot spots are then de-clustered in a stage 335. Should there be a certain remaining concentration of power supply voltage droops (for example, greater than ten percent of the power supply voltage) within the hot spot regions, the power-grid tier for the affected tiles may be adjusted in a step 340 by assigning a power-grid tier having an increased density of power switches. Should the resulting power supply voltage drop within the hot spot tiles result in some deviation from VDD by a threshold value such as a deviation greater than 10 mV, the power-grid tier for the affected hot spot tiles may be further adjusted by assigning a power-grid tier having more a robust lower metal layer pitch and width for the power and ground (PG) rails in an act 345. In that regard, a semiconductor process will typically offer a plurality of metal layers ranging from a lowest-most metal layer adjacent the semiconductor die to an upper-most metal layer that is furthest from the semiconductor die. Act 345 is thus directed to decreasing the pitch and increasing the width for the power and ground (PG) rails in the lower metal layers. Should the resulting power supply voltage drop within the hot spot tile still have some reduced threshold deviation from the power supply voltage as compared to act 345 such as a power supply voltage drop greater than 5 mV, the affected tiles may be assigned an even more robust power-grid tier having a decreased upper metal layer pitch and increased width for the PG rails in an act 350. For example, in an embodiment having eight metal layers, the four lower-most metal layers may be affected by act 345 whereas the four upper-most metal layers may be affected by act 350. Conventional routing and finishing acts may then be performed followed by any necessary opportunistic adjustment of the power-grid tiers to complete place and route stage 310.

Figure 2:
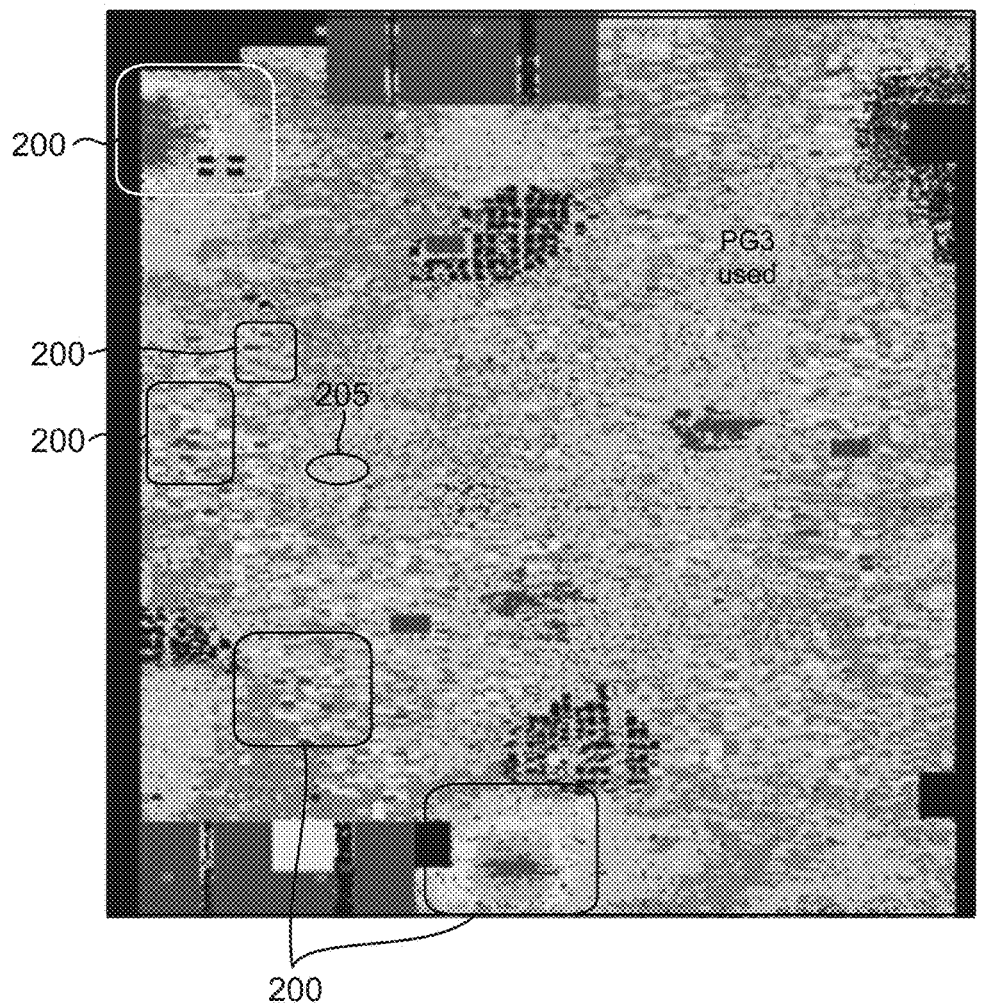
FIG. 2 illustrates the floorplan for a hard macro designed according to the process of FIG. 1.
Figure 4:
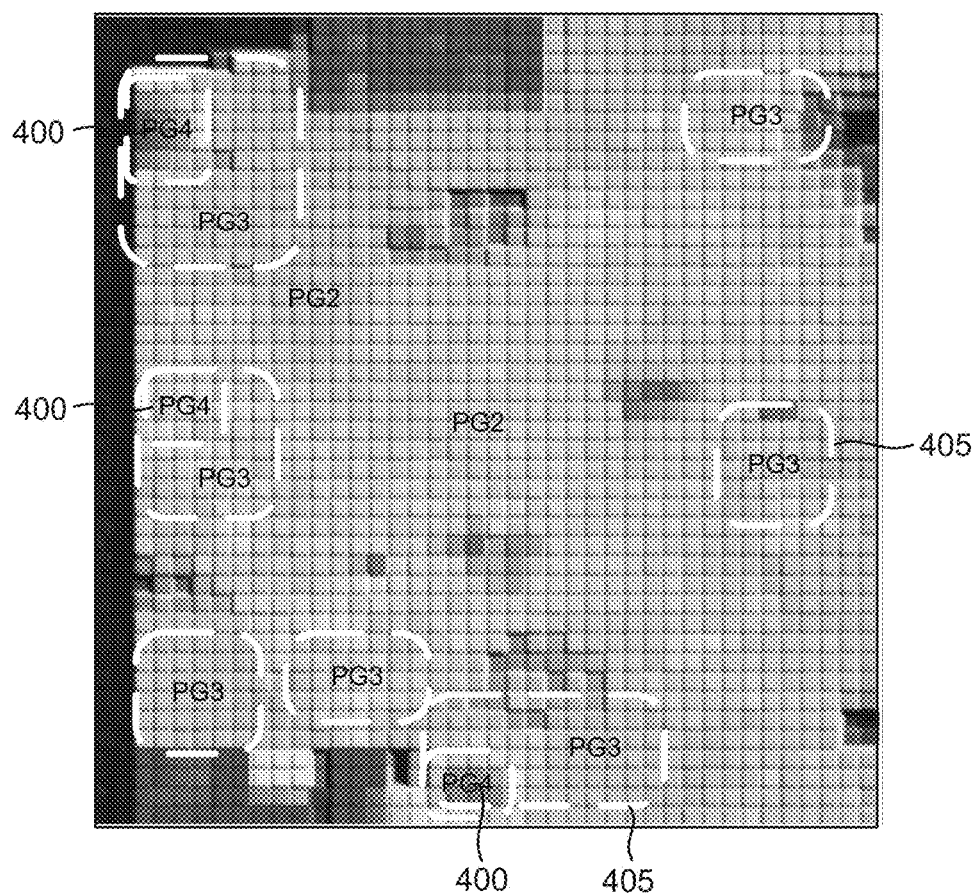
FIG. 4 is a floorplan for the hard macro of FIG. 2 designed according to the process of FIG. 3.

A conventional RC extraction stage 320, timing, noise and power analysis stage 325, and IR drop analysis 330 follows place and route stage 310. But note that further engineering change orders (ECOs) are no longer necessary (an ECO from IR drop analysis 330 such that the process begins anew at power-grid planning stage 305) due to the adjustment of the power-grid tiers in place and route stage 310 and initial planning stage 305. The resulting adaption of the power-grid tiers are shown in FIG. 4 for the same hard macro as used in FIG. 2. Localized hot spots for tiles 400 are markedly reduced in size and are assigned the most robust power-grid tier (PG4). Tiles 405 with more reduced power supply voltage drops as compared to tiles 400 are assigned the second-highest power-grid tier (PG3). The bulk of the hard macro, however, has received the more relaxed power-grid tier (PG2). In contrast, the same hard macro designed using conventional techniques as discussed with regard to FIG. 2 used the more advanced power-grid tier PG3 across the entire hard macro, which lowers density yet results in the more aggravated hot spots 200. In contrast, the hard macro of FIG. 4 has improved metal layer utilization, greater density, and reduced manufacturing costs.

Figure 5A:
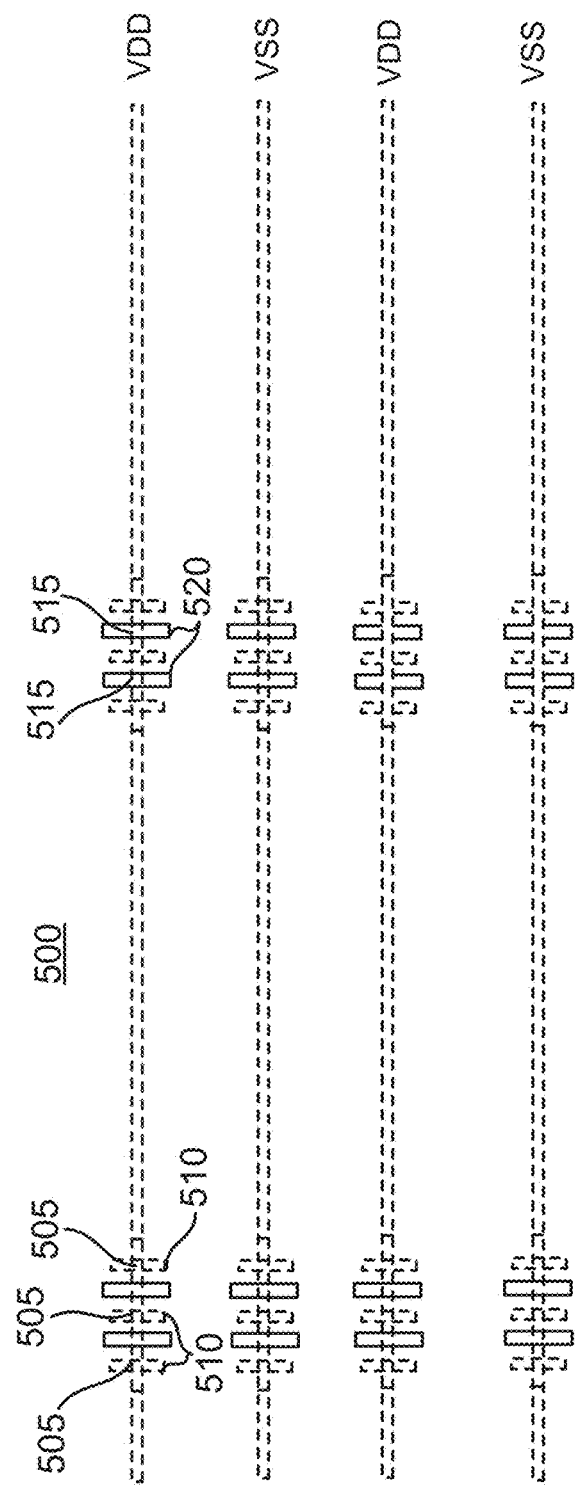
FIG. 5A is a plan view of the via density for metal layers M1-M4 for power-grid tiers PG2 and PG3 for a portion of a hard macro.
Figure 5B:
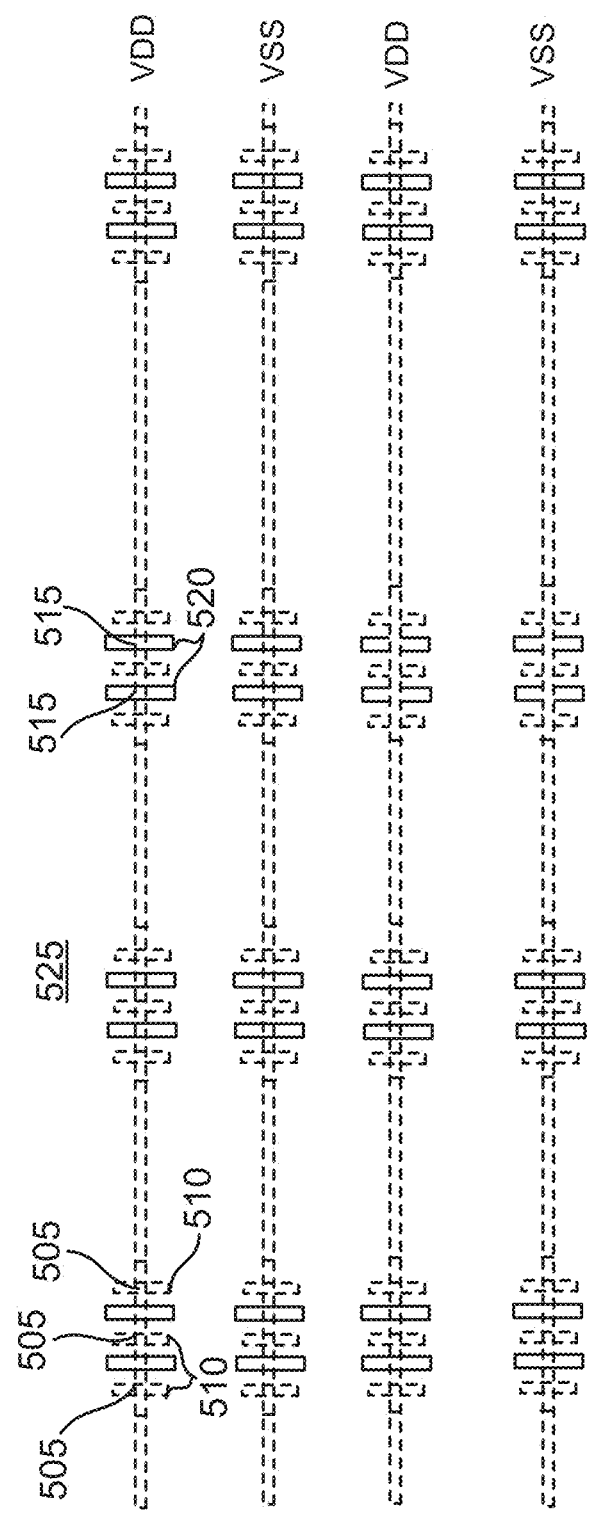
FIG. 5B is a plan view of the hard macro portion of FIG. 5A after an power-grid tier upgrade to PG4.

Some example power-grid tiers will now be discussed. In one embodiment, power-grid tiers PG2 and PG3 share the same density of vias in the lower metal layer M1 through M4. For example, the via density is shown in FIG. 5A for metal layers M1 through M4 for a hard macro tile with either a PG2 or a PG3 power-grid tier assignment. Vias 505 extend from metal layer M3 to metal layer M1 for both the power rails VDD and the ground rails VSS and are surrounded by metal shields 510. Similarly, vias 515 extend from metal layer M4 to metal layer M2 for both the power rails VDD and ground rails VSS and are surrounded by metal shields 520. As shown in FIG. 5B when the same tile is upgraded to power-grid tier PG4, the density of vias 505 and 515 is effectively doubled (as is the density of the corresponding metal shields 510 and 520, respectively). In this fashion, a localized hot spot for a tile may be reduced in size through the assignment of a more robust power-grid tier. An example method of assigning the power-grid tiers for a hard macro will now be discussed.

Figure 6:
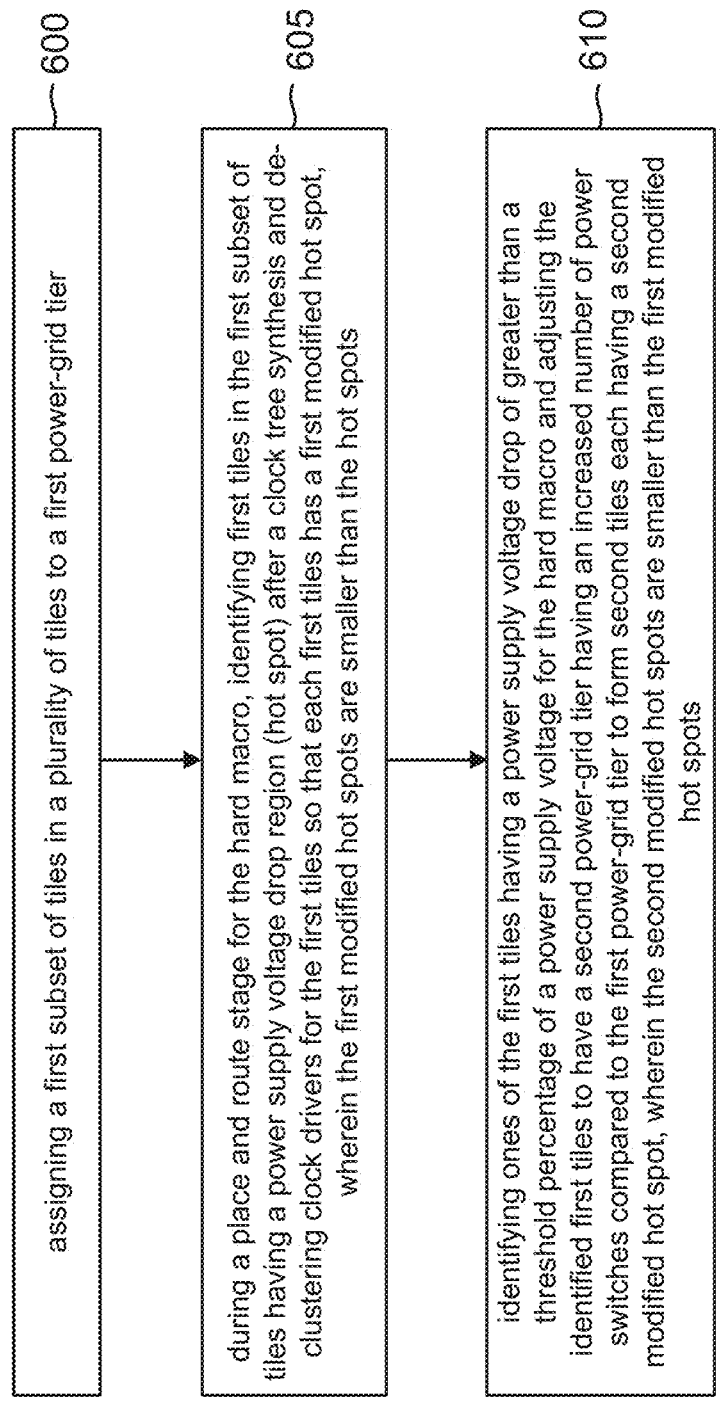
FIG. 6 is a flowchart for an example method of assigning the power-grid tiers for a hard macro in accordance with an aspect of the disclosure.

FIG. 6 is a flowchart for a method of assigning the power-grid tiers for a hard macro in accordance with an aspect of the disclosure. The method includes an act 600 of assigning a first subset of tiles in a plurality of tiles for a hard macro to a first power-grid tier. The assignment of a power grid-tier to the critical path tiles in act 305 is an example of act 600. In addition, the method includes an 605 of, during a place and route stage for the hard macro, identifying first ones of the tiles in the first subset of tiles having a power supply voltage drop region (hot spot) after a clock tree synthesis and de-clustering clock drivers for the first tiles so that each first tile has a first modified hot spot, wherein the first modified hot spots are smaller than the hot spots. An example of such an identification for act 605 occurs in the power grid planning stage 305 discussed with regard to FIG. 3. The de-clustering of clock drivers in the hot-spot-containing tiles as discussed with regard to step 335 of FIG. 3 is an example of act 605. Finally, the method includes an act 610 of identifying ones of the first tiles having a power supply voltage drop of greater than a threshold percentage of a power supply voltage for the hard macro and adjusting the identified first tiles to have a second power-grid tier having an increased number of power switches compared to the first power-grid tier to form second tiles each having a second modified hot spot, wherein the second modified hot spots are smaller than the first modified hot spots. The addition of extra power switches to those tiles having a significant power supply voltage drop as discussed with regard to step 340 is an example of act 610.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. An integrated circuit module, comprising:
   a first plurality of tiles,
   a second plurality of tiles, wherein the integrated circuit module occupies a footprint on a semiconductor die, and wherein a first portion of the footprint includes the first plurality of tiles and a second portion of the footprint includes the second plurality of tiles;
   a first power-grid tier for each tile in the first plurality of tiles; and
   a second power-grid tier for each tile in the second plurality of tiles, wherein the first power-grid tier has a greater via density than the second power-grid tier for vias extending between metal layers defining power rails and ground rails for the integrated circuit module.

2. The integrated circuit module of claim 1, wherein a plurality of power rails and ground rails for the first power-grid tier have a greater width than a width for a plurality of power rails and ground rails for the second power-grid tier.

3. The integrated circuit module of claim 1, wherein a plurality of power rails and ground rails for the first power-grid tier have a smaller pitch than a pitch for a plurality of power rails and ground rails for the second power-grid tier.

4. The integrated circuit module of claim 1, wherein the integrated circuit module comprises a single hard macro.

5. The integrated circuit module of claim 1, wherein the first power-grid tier comprises a plurality of power-grid tiers having different via densities.

6. The integrated circuit module of claim 1, wherein the first power-grid tier includes a greater number of power switches than the second power-grid tier.

7. The integrated circuit module of claim 4, wherein a bulk of the single hard macro has a power-grid tier having a lowest density of vias.

\* \* \* \* \*